March 19, 1968   G. H. MOREY   3,374,338

GROUNDED HEATING MANTLE

Filed Sept. 29, 1965

INVENTOR.
GLEN H. MOREY
BY

United States Patent Office 3,374,338
Patented Mar. 19, 1968

3,374,338
GROUNDED HEATING MANTLE
Glen H. Morey, Terre Haute, Ind., assignor to Templeton Coal Company, Terre Haute, Ind., a corporation of Indiana
Filed Sept. 29, 1965, Ser. No. 491,301
4 Claims. (Cl. 219—529)

ABSTRACT OF THE DISCLOSURE

Flexible heating blanket made up of separable parts and having eyelets along the edges to receive lacing to fasten the parts together about an object to be heated and with flexible electrically conductive coatings on the outer surfaces of said parts insulated from the resistance heating means carried by the blanket parts but interconnected with each other and to ground.

---

This invention relates to heating blankets or mantles of the type that are placed on pipes, valves, vessels and like pieces of equipment for heating them to, or maintaining them at, a predetermined temperature and, is particularly concerned with a heating blanket or mantle of this nature in which grounding means are provided.

Heating blankets of the nature with which the present invention is concerned are known and, in general, comprise flexible textile or textile-like members having affixed thereto electric resistance heating elements with suitable layers of insulation, both electrical and thermal, being provided. The heating blankets are constructed so to fit a pipe or container or a fitting or a piece of equipment of any shape which must be heated or be kept warm. The blankets are usually designed so that they can be wrapped about or placed about the equipment to be heated when the equipment is installed and the blankets are then laced up so as to enclose the piece of equipment and thereafter, when electrical energy is supplied to the blankets, heat will be conveyed to the piece of equipment on which the blanket is mounted.

The blankets referred to have wide use in industry, particularly in the chemical industry, and it is often the case that personnel will come in contact with the blankets. Due to the fact that the blankets may become conductive, some hazard exists to the personnel if, for some reason, the blankets become electrically conductive as, for example, due to spillage of liquids thereon. Also, static electricity could accumulate on the blankets to such an extent that the potential builds up to a level that the possibility would exist that the static electriciy would discharge from the blanket and form a spark that could ignite explosive vapors.

With the foregoing in mind, the present invention has as its primary objective, the provision of a heating blanket and a method of making the heating blanket in which the dangers referred to are eliminated.

A particular object of the present invention is the provision of a heating blanket of the nature referred to which can be grounded and therefore will have no tendency to develop an electrical potential thereon.

A still further object is the provision of a heating blanket of the nature referred to which is grounded but which retains sufficient flexibility to permit it readily to be placed on and removed from equipment to be heated thereby.

The objects referred to above as well as other objects and advantages of the present invention will become more apparent upon reference to the following specification taken in connection with the accompanying drawings, in which.

Figure 1:
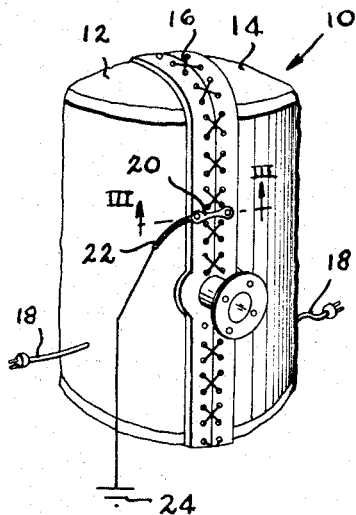
FIGURE 1 is a perspective view showing one form of heating blanket such as might be employed on a more or less conventionally shaped tank or container.
Figure 3:
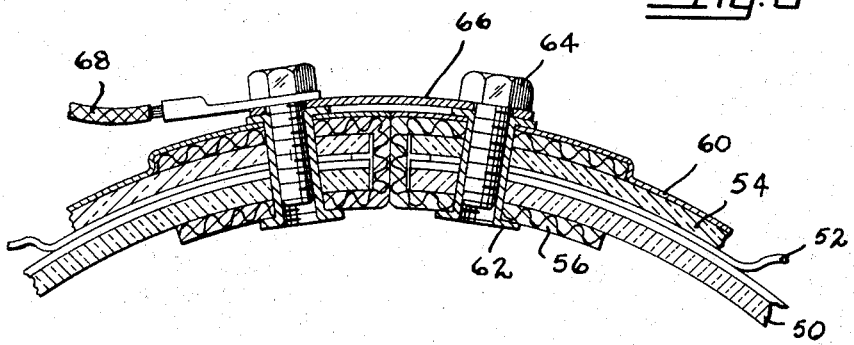
Figure 4:
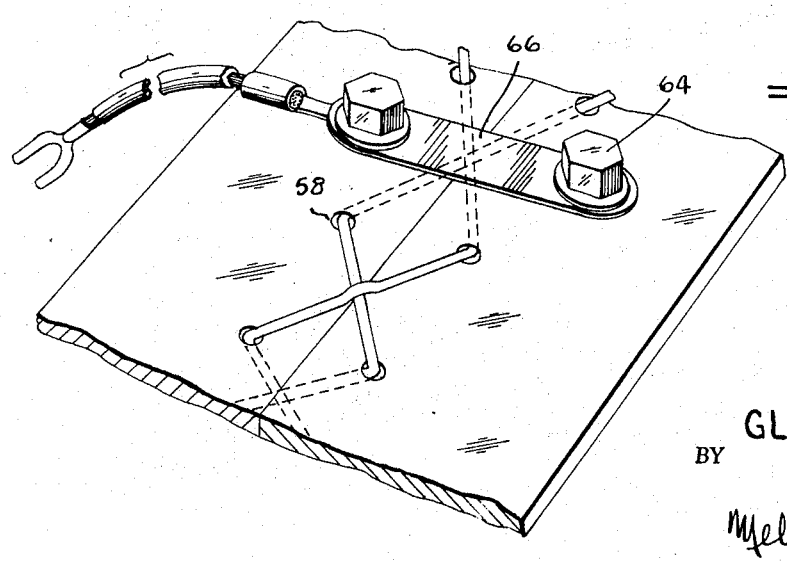

FIGURE 3 is a sectional view indicated by line III—III on FIGURE 1 and shows more in detail the construction of the heating blankets and the use of a grounding strap extending between two adjacent laced together portions of the blanket; and FIGURE 4 is a perspective view showing the grounding strap and the lacing by means of which two adjacent portions of a heating blanket may be connected together.

Referring to the drawings somewhat more in detail, in FIGURE 1, a generally cylindrical piece of equipment is provided with a heating blanket generally indicated at 10 and which comprises two portions 12 and 14 each shaped to fit over about one half of the container and being interconnected at their abutting edges by lacing 16 so as to form a relatively complete and snug closure about the piece of equipment. The heating element in each portion of the heating blanket may be supplied with electrical energy via a lead-in cable 18, or a single lead-in cable can be provided and connector means can be supplied for connecting the heating elements of the two portions of the blanket in circuit with each other.

According to the present invention the blankets, at least with respect to the outer layers thereof, are made electrically conductive and the two blanket portions may then be interconnected by a metal strap 20 from which there leads a ground wire 22 to a grounding point 24. By the provision of the grounding arrangement, the build up of electrical potential on the blanket is prevented and, if for any reason, the blanket becomes connected to a source of electricity, the electric potential will be drained off by the ground connection and the possibility will be eliminated of drawing sparks from the blanket which might ignite explosive vapors in the region of the blanket, or of any personnel being electrically shocked from touching the blanket.

Figure 2:
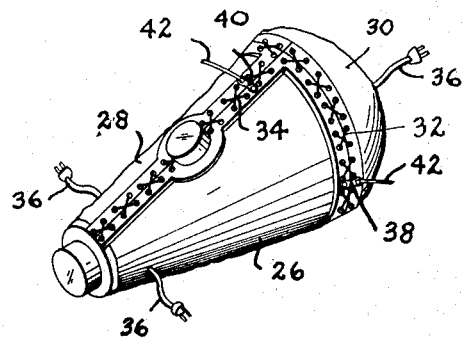
FIGURE 2 is a view similar to FIGURE 1 but shows how a heating blanket according to the present invention could be adapted to a somewhat differently shaped piece of equipment, which might, for example, be generally conical.

In FIGURE 2 the container is substantially conically shaped and the blanket in this case might take the form of the three portions 26, 28 and 30 connected together by the lacing indicated at 32 and 34. The heating element of each blanket portion may have its own lead-in cable 36 or, as before, the heating elements of the separate portions of the blankets may be electrically interconnected and a single lead-in cable provided therefor.

The portions of the heating blankets have at least their outer surface regions made electrically conductive and the said regions may, furthermore, be interconnected by the straps 38 and 40, one or both of which may be grounded as by the ground wires 42. As in connection with the modification of FIGURE 1, the grounding of the blanket keeps the entire surface of the blanket at ground potential at all times.

The actual construction of the blankets, known per se, can take somewhat the form illustrated in FIGURE 3 wherein the layer at 50 indicates an inner fabric or textile layer of heat resistant electrical insulating material, such as glass, asbestos, or quartz, and which is to be disposed adjacent the piece of equipment on which the heating blanket is mounted. Carried on layer 50 is an electric resistance heating element 52. Heating element 52 may be in the form of a wire or ribbon or the like and is advantageously stitched to layer 50 so as to support the heating element in the proper location thereon. In this manner the reaches or convolutions of the heating elements are supported in the proper distributed relation over the surface of the piece of equipment to be heated.

Arranged in covering relation to heating element 52 is insulation means 54 in the form of a material which is both electrically non-conductive and which is poorly conductive of heat as well. For example, fiber glass batting or asbestos fabric or the like could make up layer 54. This is preferably joined with layer 50 by stitching or the like to form a unitary structure and so as to enclose and insulate the heating element. The edges of the heating blanket may advantageously be bound by textile binding strips 56, stitched in place and which prevent exposure or fraying of the edge portions of the blanket. It is in the said edges that the eyelets 58 (FIGURE 4) are placed for receiving the lacing by means of which the heating blanket portions are secured together on a piece of equipment.

According to the present invention, the outer layer 54 has at least its outer surface coated or impregnated with an electrically conductive material 60 which is preferably in the form of a thin metal layer sprayed on the outer surface.

The coating material, which may either be a coating film, confined to the surface of the outer layer 54, or an impregnant that not only coats the surface but also impregnates the outer layer, forms a continuous electrically conductive coating over the entire outer surface of the heating blanket. This conductive surface is adequate, when grounded, to maintain the outer surface of the blanket at ground potential at all times, thus eliminating the danger of shock to personnel touching the blanket.

Any suitable grounding means can be provided for grounding the electrically conductive outer coating of the blanket and FIGURE 3 shows one way in which this might be done. Metal eyelets 62 are provided in the edges of the blankets which are in electrical contact with the conductive coating. These eyelets may be threaded for receiving cap screws 64 and an electrically conductive interconnecting strap 66, metal, for example, may extend between the cap screws. The strap 66 electrically interconnects the adjacent blanket portions, with respect to the conductive grounding coating or impregnating layer thereon and to one of the cap screws may be connected the grounding wire 68 corresponding to previously mentioned ground wires 22 and 42 and FIGURES 1 and 2.

The arrangement according to the present invention is relatively simple and inexpensive and substantially completely eliminates the hazards that have sometimes been encountered with heating blankets of the nature referred to which have not been grounded.

It will be understood that this invention is susceptible to modification in order to adapt it to different usages and conditions; and accordingly, it is desired to comprehend such modifications within this invention as may fall within the scope of the appended claims.

What I claim is:

1. In a heating blanket; a plurality of blanket portions adapted for being placed in edge to edge relation in enclosing relation to a piece of equipment to be heated by the blanket, each said blanket portion comprising a textile like body of electrical insulating material and electric resistance heating element means carried thereon, each said blanket portion being flexible and having its edge portions provided with eyelets, lacing extending through said eyelets and interconnecting the adjacent edges of adjacent blanket portions, a flexible electrically conductive coating on the outer surface of each of said blanket portions and electrically insulated from the respective heating elements, terminals on the adjacent edges of said blanket portions in close proximity to each other and electrically connected with the respective said coatings, first conductor means electrically connecting adjacent ones of said terminals to interconnect all of said coatings, and second conductor means connected at one end to said interconnected coatings and connected at the other end to ground.

2. In a heating blanket; a plurality of blanket portions adapted for being placed in edge to edge relation in enclosing relation to a piece of equipment to be heated by the blanket, each said blanket portion comprising a textile like body of electrical insulating material and electric resistance heating element means carried thereon, each said blanket portion being flexible and having its edge portions provided with eyelets, lacing extending through said eyelets and interconnecting the adjacent edges of adjacent blanket portions, a flexible electrically conductive coating on the outer surface of each of said blanket portions and electrically insulated from the respective heating element means, first conductor means connected to adjacent blanket portions and detachable from at least one thereof and electrically interconnecting the coatings of adjacent ones of said blanket portions, and second conductor means connected to at least one blanket portion and connecting said interconnected coatings to ground.

3. In a heating blanket; a plurality of blanket portions adapted for being placed in edge to edge relation in enclosing relation to a piece of equipment to be heated by the blanket, each said blanket portion comprising a textile like body of electrical insulating material and electric resistance heating element means carried thereon, each said blanket portion being flexible and having its edge portions provided with eyelets, lacing extending through said eyelets and interconnecting the adjacent edges of adjacent blanket portions, an electrically conductive coating on the outer surface of each said blanket portion and electrically insulated from said heating element means, metal eyelet means in each blanket portion close to the edge thereof also electrically insulated from said heating element means and in electrical contact with the said conductive coating on the respective blanket portion, a metal strap leading between the said eyelet means of adjacent blanket portions, screws extending through said metal strap and into said eyelet means, and a ground wire leading from said strap means to ground.

4. A heating blanket according to claim 3 in which said coating is a sprayed-on metal coating adherent directly to the outer surface of the respective blanket portion.

References Cited

UNITED STATES PATENTS

| | | | |
|---|---|---|---|
| 1,761,829 | 6/1930 | Heinemann | 219—211 X |
| 2,028,889 | 1/1936 | Baddour | 219—535 X |
| 2,231,506 | 2/1941 | Morey | 219—535 |
| 2,252,423 | 8/1941 | Baddour | 219—527 |
| 2,482,665 | 9/1949 | Geyer | 219—529 |
| 2,565,443 | 8/1951 | Vogel et al. | 219—445 |
| 2,845,519 | 7/1958 | Willat | 219—528 |
| 2,971,073 | 2/1961 | Eisler | 219—345 X |

FOREIGN PATENTS

| | | |
|---|---|---|
| 713,684 | 8/1954 | Great Britain. |
| 765,709 | 1/1957 | Great Britain. |

RICHARD M. WOOD, *Primary Examiner.*

V. Y. MAYEWSKY, *Assistant Examiner.*